(12) United States Patent
Ishizuka et al.

(10) Patent No.: US 6,188,155 B1
(45) Date of Patent: Feb. 13, 2001

(54) SPINDLE MOTOR

(75) Inventors: Yutaka Ishizuka; Masayoshi Saichi; Yoshinari Yoko, all of Nagano (JP)

(73) Assignee: Kabushiki Kaisha Sankyo Seiki Seisakusho, Nagano (JP)

( * ) Notice: Under 35 U.S.C. 154(b), the term of this patent shall be extended for 0 days.

(21) Appl. No.: 09/455,330

(22) Filed: Dec. 6, 1999

(30) Foreign Application Priority Data

Dec. 7, 1998 (JP) .................................................. 10-346305

(51) Int. Cl.$^7$ ...................................................... H02K 5/22
(52) U.S. Cl. ............................ 310/71; 310/67 R; 310/43; 310/89; 360/99.08
(58) Field of Search ................................. 310/DIG. 6, 71, 310/67 R, 89, 43; 360/99.03, 99.04, 99.08, 99.09

(56) References Cited

U.S. PATENT DOCUMENTS

| | | | |
|---|---|---|---|
| 4,866,324 | * 9/1989 | Yuzawa et al. ....................... | 310/268 |
| 5,153,470 | * 10/1992 | Miyaji et al. ........................ | 310/67 R |
| 5,333,079 | * 7/1994 | Takegami et al. ................. | 360/99.08 |
| 5,815,345 | * 9/1998 | Pelstring et al. ...................... | 310/268 |
| 5,831,355 | * 11/1998 | Oku ......................................... | 310/42 |
| 5,986,365 | * 11/1999 | Kuwer et al. ........................... | 310/51 |

FOREIGN PATENT DOCUMENTS 6-6950 * 1/1994 (JP) ................................. H02K/5/22

* cited by examiner

Primary Examiner—Burton Mullins
(74) Attorney, Agent, or Firm—Sughrue, Mion, Zinn, Macpeak & Seas, PLLC

(57) ABSTRACT

In a spindle motor 1, a motor frame 21 is molded from a resin. Therefore, even if an impact is applied to a motor apparatus in which this motor 1 is installed, the impact can be absorbed and hence moderated by the motor frame 21, and ball bearings held by the motor frame 21 can be prevented from being deformed. In addition, since lead terminals 4 for feeding an armature are insert molded in a bottom portion 213 of the motor frame 21, there is no need to use a connector that prevents the miniaturization of the motor or an FPC board which may cause a risk of a wiring pattern being disconnected.

12 Claims, 4 Drawing Sheets

SPINDLE MOTOR

BACKGROUND OF INVENTION

1. Field of Invention

The present invention relates to a spindle motor for use as a rotational driving device for a hard disk or the like, and more particularly to a feeding construction for coils of a spindle motor.

2. Related art

A spindle motor for use as a rotational driving device (motor apparatus) for a recording disk such as a hard disk comprises a motor frame, a rotor supported via ball bearings or the like rotatably relative to the motor frame, a stator core held on the motor frame in such a manner as to confront a driving magnet of this rotor and coils wound around this stator core, and the rotor is used as a hub having a recording disk placed on an upper side thereof.

In the spindle motor constructed as described above, conventionally the motor frame is formed of a metal such as aluminum, and this motor frame is fixed to a chassis of a motor apparatus. Here, a flexible printed circuit board (hereinafter, referred to as an FPC board) or a connector is mounted on this motor frame on a side opposite (back side) to a side where the coils are disposed, and also a through-hole is formed in the motor frame for leading end portions of the coils therethrough out to the back side thereof. Thus, if the end portions of the coils are put through the through-hole so formed in the motor frame so as to be led to the back side thereof and are then electrically connected to an electrode portion of the FPC board or the connector, the coils can then be fed through this FPC board or the connector from the motor apparatus side.

In the conventional spindle motor, however, since the coils are constructed so as to be fed through a part such as the FPC board or the connector, there are caused such problems as below. In other words, in a case where a part such as the connector which is relatively thick in a height direction of the motor is fixed to a bottom portion of the motor frame, there is caused a problem that the motor is prevented from being thinned. In addition, there is a high possibility with a part such as the FPC board which protrudes to an exterior portion of the motor that it gets deformed or bent during a production process of the motor. If the FPC board is used, therefore, there are caused risks not only of a wiring pattern formed on the FPC board being disconnected but also of a terminal being deformed.

Moreover, with a notebook-sized personal computer, the more frequently it is carried by the user, the more it is subjected to a risk of being dropped, and therefore high impact resistance is required. If the conventional spindle motor is installed in the notebook-sized personal computer for driving a disk, however, there is caused a problem that the impact resistance required for the notebook-sized personal computer cannot be met due to a reason described below. Namely, as with the conventional spindle motor, if the aluminum motor frame is used, when the notebook-sized personal computer is dropped, an impact generated then is directly transmitted to the ball bearings via the motor frame and the ball bearings may thereby be deformed, and if this really happens, there are caused risks not only that noise and/or run-out is caused when the disk is rotated but also that the disk is prevented from being rotated.

SUMMARY OF INVENTION

In view of the aforesaid problems, an object of the present invention is to provide a spindle motor that can be thinned and improve the reliability in impact resistance.

According to an aspect of the present invention, there is provided a spindle motor comprising:

- a motor frame adapted to be mounted to a motor apparatus, said motor frame being formed by a resin molded piece;
- a rotor supported rotatably relative to said motor frame;
- a stator core held on said motor frame to confront a driving magnet of said rotor;
- coils wound around said stator core;
- a plurality of lead terminals embedded in said motor frame on a side thereof opposite to a side where said stator core is disposed in such a manner as to be partially exposed; and
- a through-hole formed in said motor frame for leading ends of said coils therethrough out to said side opposite to said side where said stator core is disposed for connection to said lead terminals.

As has been described heretofore, with the spindle motor according to the present invention, since the lead terminals are embedded or inserted for fixation in the resin motor frame so that they get integral with the motor frame, there is no need to fix to the bottom portion of the motor frame a connector, a part which is relatively thick in a height direction of the motor. Therefore, the motor can be thinned. Also, being different from the case where the FPC board, which is easy to be deformed, is used, with the present invention, there is no risk of the wiring pattern being disconnected or the terminals being deformed, this serving to improve the reliability of the motor. Moreover, when the spindle motor adopting the present invention is installed in a notebook-sized personal computer for driving a disk, even if the personal computer is mistakenly dropped, an impact produced then can be absorbed and hence moderated by the resin molded motor frame, whereby there is caused no risk of noise and/or run-out attributed to the impact so produced being generated while the disk is rotating, and moreover the disk can be freed from a risk of being prevented from rotating by the impact produced. Furthermore, vibrations generated to the ball bearings and the armature while the motor is being driven can be absorbed by the motor frame, whereby noise can be reduced. Also, the lead terminals are exposed from the predetermined positions on the back side of the motor frame, whereby an electrical connection can be effected between the lead terminals and the feed portion of the motor apparatus only by placing the motor frame on the motor apparatus, whereby the assembling efficiency of the motor apparatus can be improved.

Figure 1:
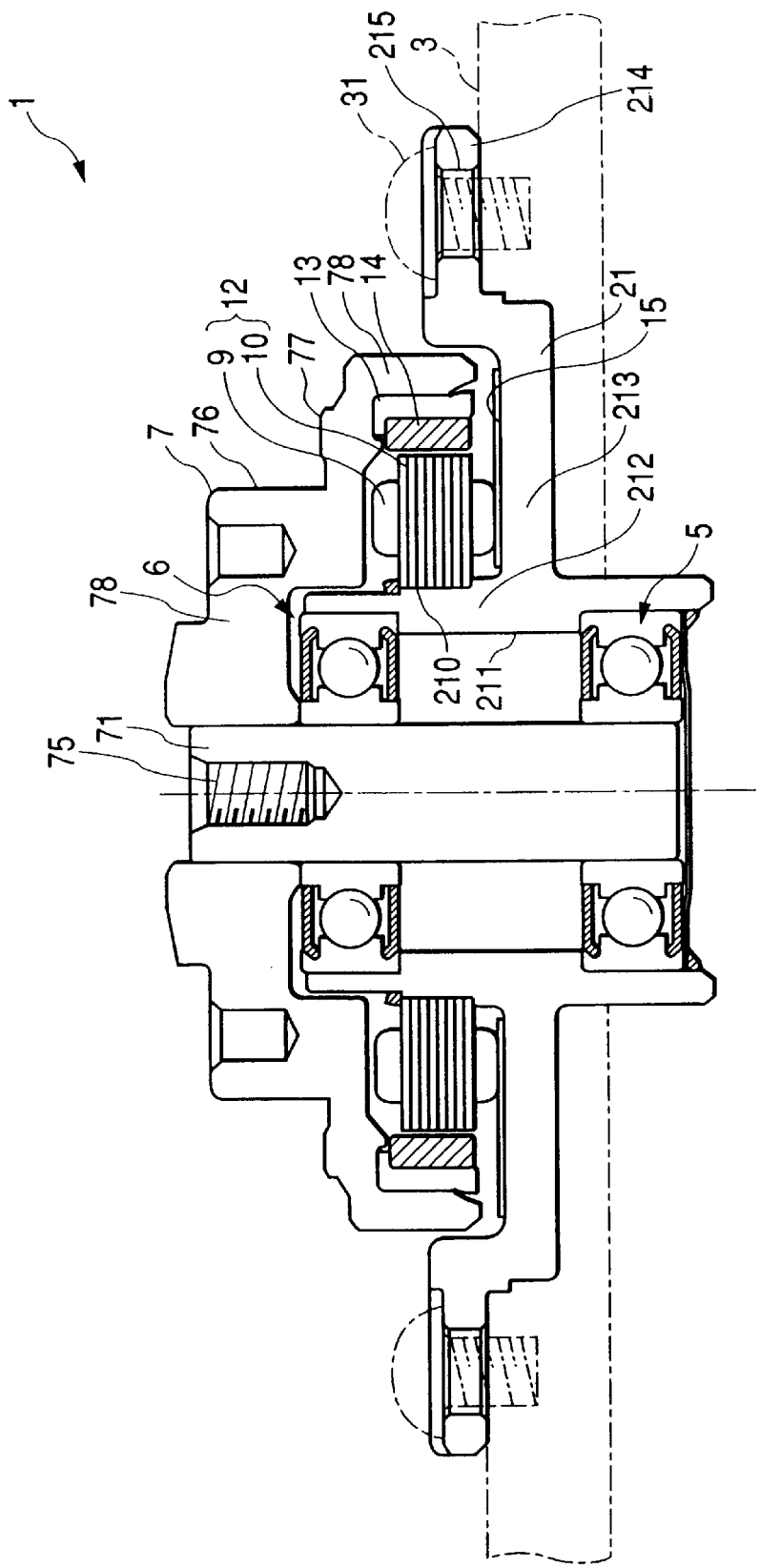
FIG. 1 is a sectional view showing a spindle motor to which the present invention is applied.
Figure 3A:
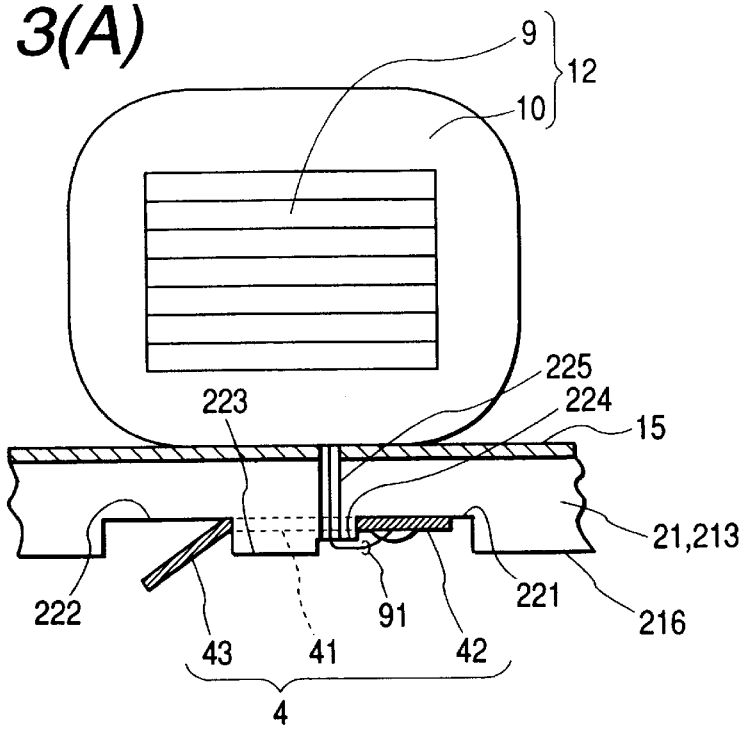
Figure 4A:
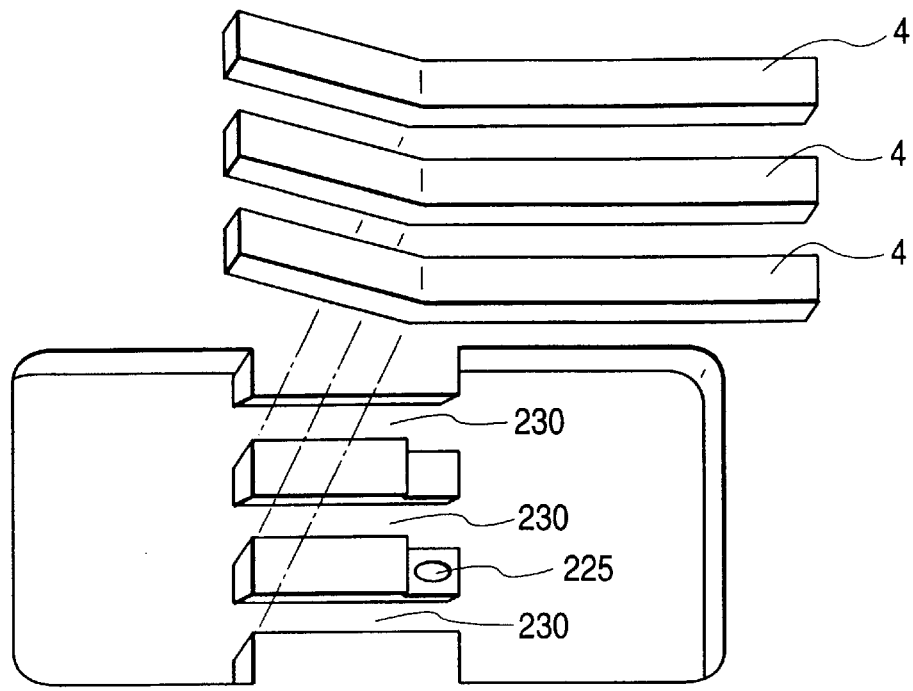
Figure 4B:
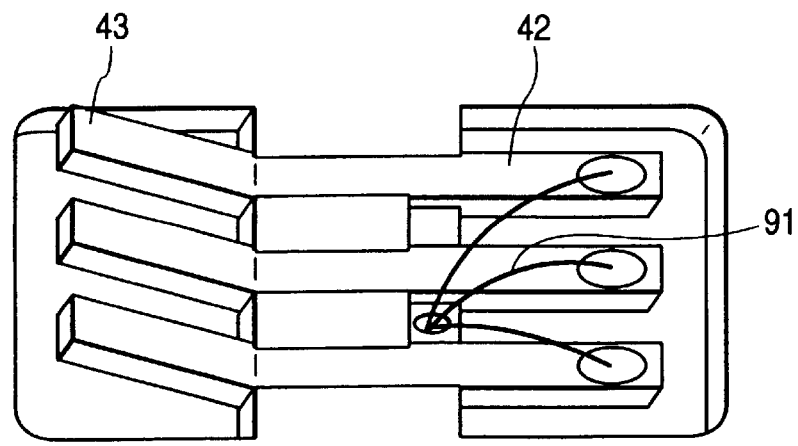
Figure 5:
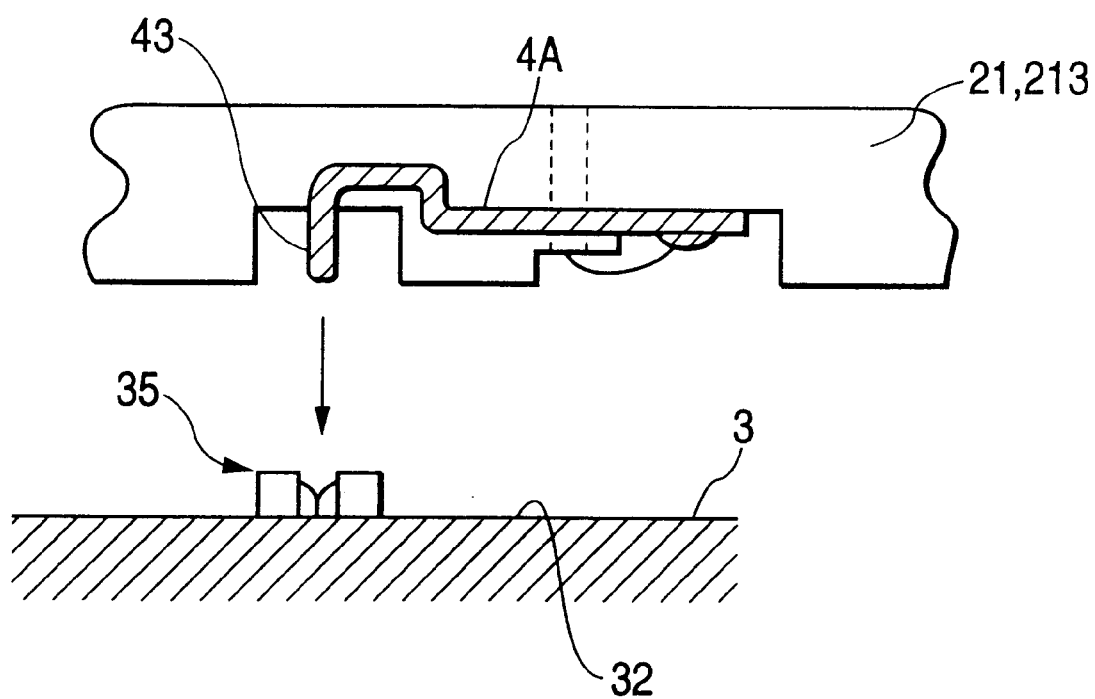

FIG..3 (A)is an explanatory view showing a mounting construction of a lead terminal of the motor shown in FIG. 1, FIG. 3 (B) is an explanatory view showing a feed terminal adapted to be connected to the lead terminal shown in FIG. 3(A);

FIG. 4 (A) and (B) are perspective views showing an enlarged main portion of the spindle motor to which the present invention is applied, and FIG. 4 (A) shows a state before the lead terminals are fixed and FIG. 4(B) a state after the lead terminals have been fixed; and FIG. 5 is an explanatory view showing a modified example of a lead terminal for use in the spindle motor to which the present invention is applied.

DETAILED DESCRIPTION OF PREFERRED EMBODIMENTS

Referring to the accompanying drawings, a mode of operation of the present invention will be described below.

FIG. 1 is a sectional view showing the whole of a spindle motor for driving a disk to which the present invention is applied. In FIG..1, a spindle motor 1 is a rotational driving device for driving a 3.5 inch hard disk and it has a hub 7 (rotor) for holding a hard disk, not shown, a rotational shaft 71 extending downwardly from a center of the hub and a motor frame 21 comprising a bearing holding hole 211 for supporting rotatably the rotational shaft 71 via first and second ball bearings 5, 6.

The motor frame 21 is constituted by a cylindrical portion 212 forming the bearing holding hole 211, an annular bottom portion 213 protruding outwardly from an axial intermediate portion of the cylindrical portion 212 and a motor mounting portion 214 erecting from an outer circumferential edge of the annular bottom portion and then protruding outwardly. Mounting holes 215 are formed in the motor mounting portion 214, and the motor frame 21 is secured with screws 31 to a chassis 3 regarded as a mounting portion to an information recording/reproducing device main body such as a notebook-sized personal computer. In addition, an insulating sheet 15 is affixed to an upper surface of the bottom portion 213 of the motor frame 21.

An upper outer circumferential surface of the cylindrical portion 212 of the motor frame 21 is formed as a core holding portion 210, and a stator core 10 is mounted on the core holding portion 210 by utilizing a step formed on the outer circumferential surface thereof. Coils 9 are wound around this stator core 10 so as to form an armature 12.

The hub 7 has a cub-like shape made to open downwardly, and an end of the rotational shaft 71 is fitted in a central portion of a top plate 78. A disk guide 76 is formed around the hub 7 for allowing a 3.5 inch hard disk to be fitted thereon, and a portion expanding outwardly from a lower end portion of this disk guide portion 76 is formed as a disk resting surface 77.

In the hub 7, a cylindrical side portion extends downwardly from an outer circumferential side of the disk resting surface 77, and an annular driving magnet 14 is adhered to an inner circumferential surface of the side portion 77 via an annular yoke 13 for fixation thereat. In this state, the driving magnet 14 and the stator core 10 confront each other. Therefore, when current is supplied to the coils 9, the hub 7 is rotated by virtue of an electromagnetic action between the coils 9 and the driving magnet 14, and hence the hard disk mounted on the hub 7 can then be rotated.

Figure 2:
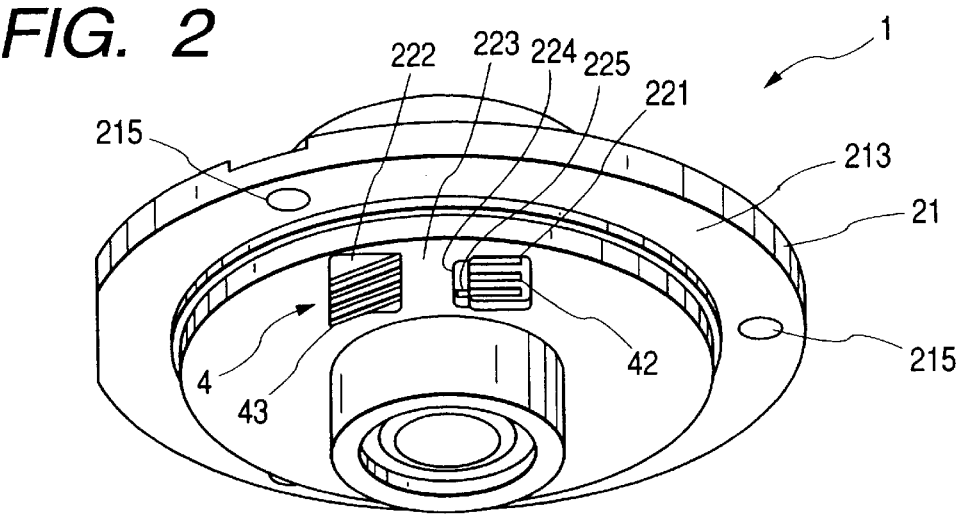
FIG. 2 is a perspective view showing a motor frame of the motor shown in FIG. 1 seen diagonally from below thereof.

FIG. 2 is a perspective view showing the motor frame of the spindle motor 1 as seen diagonally from therebelow.

In the spindle motor 1 according to the present mode of operation of the invention, the motor frame 1 is constituted by a resin molded piece. Raised as resins used in this mode are engineering plastics such as polycarbonate, polyphenylene sulfide, polyacetal, polyamide or polyethylene terephthalate.

In addition, in this mode, three lead terminals 4 are insert molded in the bottom portion 213 of the motor frame 21, which lead terminals are each constituted by silver-plated phosphor bronze. These lead terminals 4 are used to feed the coils 9 of the armature 12, and in this insert molded state, a part thereof is exposed from the bottom portion 213 of the motor frame 21.

In other words, as shown in FIGS. 2 and 3(A), formed in a back side 216 of the bottom portion 213 of the motor frame 21 are first rectangular recessed portion 221 and a second rectangular recessed portion 222, and longitudinal central portions 41 of the lead terminals 4 are each embedded in a terminal holding portion 223 located between the first and second recessed portions 221, 222. In this state, one end of each of the lead terminals 4 is exposed toward an inner side of the first recessed portion 221 and the other end is so done in the second recessed portion 222. Here in this state, the one end portions 42 of the lead terminals 41 are tightly secured to a bottom portion of the first recessed portion 221, while the other end portions 43 thereof are raised diagonally downwardly. Thus, the other end portions 43 of the lead terminals 4 are in a state in which they are separated from a bottom portion of the recessed portion 22 to float thereunder.

In addition, a third recessed portion 224 is formed in the back side 216 of the bottom portion 213 of the motor frame 21 in such a manner as to be contiguous with and shallower than the first recessed portion 221. A through-hole 225 is opened in this third recessed portion 224 so as to penetrate it vertically. Three lead wires 91 (ends of the coils 9) are put through the through-hole 25, and distal end portions of the respective lead wires 91 are then soldered to the one end portions 42 of the lead terminals 4, respectively. In other words, the one end portions 42 of the lead terminals 4 each constitute a connecting portion for connection with the end portions of the coils 9.

Figure 3B:
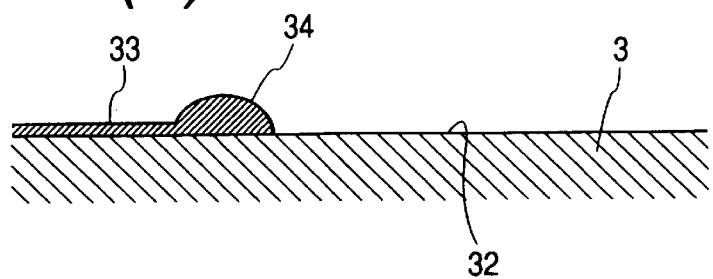

The spindle motor 1 in which the end portions of the coils 9 are now connected to the one end portions 42 of the lead terminals 4 is then installed on a motor resting surface 32 of the motor apparatus shown in FIG. 3(B) in that state. Here, a feed portion is formed on the motor resting surface 32 at a position where it overlaps the back side 216 of the bottom portion 213 of the motor frame. In addition, a distal end portion 34 of the feed terminal 33 is rounded in such a manner as to protrude upwardly. Therefore, when the bottom portion 213 of the motor frame 21 is placed on the motor resting surface 32, the other end portions 43 of the lead terminals 4 are brought into contact with the distal end portion 34 of the feed terminal 33. Moreover, since the other end portions 43 of the lead terminals 4 are floated diagonally inwardly, when the distal end portion 34 of the feed terminal 33 is brought into contact with the other ends 43 of the lead terminals, the other end portions 43 of the lead terminals 4 are elastically deformed, whereby the distal end portion 34 of the feed terminal 33 and the other end portions 43 of the lead terminals 4 are put in an elastic contact with each other. Therefore, the feed terminal 33 and the lead terminals 4 are caused to contact each other securely, whereby the coils 9 can be fed from the motor apparatus via the feed terminal 33 and the lead terminals 4. In addition, since the one end portions 42 of the lead terminals 4 extend toward the bottom surface of the recessed portion 216, even when the bottom portion 213 of the motor frame 21 is placed on the motor resting surface 32, they do not abut the motor resting surface 32.

Thus, in the spindle motor according to the present mode, since the plurality of lead terminals 4 are insert molded in the motor frame 21 to be integral therewith, there is no need to use the connector which prevents the miniaturization of the motor or the FPC board which may entail a risk of the wiring pattern being disconnected. Therefore, with the spindle motor 1 of this mode, the miniaturization and improvement in reliability can be attained.

In addition, in a case where the spindle motor 1 according to the present mode of operation of the invention is installed in a notebook-sized personal computer for driving a disk, even if the personal computer is mistakenly dropped, an impact produced thereby is absorbed by the motor frame 21 constituted by a resin molded piece or the like and the impact is thus moderated. Owing to this construction, being different from the case with the conventional motor frame formed of a metal such as aluminum, there is no risk of the impact being directly transmitted to the ball bearings 5, 6. Consequently, since there is no risk of the ball bearings 5, 6 being deformed by virtue of an impact produced when the computer is dropped, there is no risk of noise and/or run-out attributed to the impact produced when the device is dropped being generated during rotation of the disk, and moreover there is no risk of the disk being prevented from rotating by the impact so produced. Moreover, since vibrations generated to the ball bearings 5, 6 when the motor is driven are absorbed by the motor frame 21, the noise can also be reduced. Furthermore, since the lead terminals 4 are exposed from the predetermined positions on the back side of the motor frame 21, an electric connection can be established between the lead terminals 41 and the feed terminal 33 (feed portion) only by placing the motor frame 21 over the feed terminal 33 of the motor apparatus. Therefore, the efficiency in assembling the motor apparatus can also be improved.

In addition, since the lead terminals 4 are each embedded in the terminal holding portion 223 of the motor frame 21 at the central portions thereof 41, the connecting portions to the end portions 91 of the coils 9 are constituted by the one end portions 42 of the lead terminals, while the contact portions 43 to the feed terminal 33 on the motor apparatus side are constituted by the other end portions. Thus, with the construction in which the central portions 41 of the lead terminals 4 are embedded in the motor frame, even when the end portions of the terminals can be used as the connecting portions 42 to the coils 9 and the contact portions 43 with the feed terminal 33 of the motor apparatus, the connecting portions 42 and the contact portion 43 can be located at accurate positions. In addition, with the same construction, the contact portion 43 can be constructed so as to protrude from the back side of the motor frame 21. Therefore, this can realize a construction in which the contact portions 43 can come to elastic contact with the feed terminal 33 of the motor apparatus, thereby making it possible to simplify a connecting operation of the feed terminal 33 of the motor apparatus with the lead terminals 4. Furthermore, secure connections can be attained between the feed terminal 33 and the contact portions 43 of the lead terminals 4.

Moreover, since it is formed from an engineering plastic, the motor frame 21 can be produced as having superior impact and heat resistances.

In addition, with the aforesaid mode of operation of the invention, the construction is adopted in which the part of the respective lead terminals 4 are embedded in the motor frame 21 by insert molding the lead terminals 4 when resin molding the motor frame 21, but a construction shown in FIG. 4 may be adopted. In other words, as shown in FIG. 4(A), when resin molding the motor frame 21, a plurality of groove-like terminal insertion portions 230 for receiving therein individually the lead terminals 4 are formed in advance, and thereafter, as shown in FIG. 4(B), the lead terminals 4 are independently inserted into the respective terminal insertion portions 230 for fixation thereat. Thereafter, the end portions 91 of the plurality of coils 9 are led out of the through-hole 25 and are then soldered respectively to the connecting portions 42 of the lead terminals 4, thus another construction of the feed portion of the spindle motor being realized.

As a fixing method that is used herein, it is possible to utilize a method in which the terminal insertion portions 230 are formed narrower than the lead terminals 4 and then the terminals 4 are press fitted therein, or a method in which the lead terminals 4 are adhered for fixation in the terminal insertion portions 230.

In a case where the aforesaid construction is adopted, being different from the case where the lead terminals 4 are insert molded in the resin, the lead terminals 4 are not subjected to heat produced during molding, and therefore even if a lead terminal having a gold- or silver-plated layer formed on the surface thereof is used as the lead terminals 4, there is provided an advantage that there is no risk of that plated layer is deteriorated or dissolved. Here, as to the lead terminals 4, a lead terminal may be used in which a plurality of terminal portions are connected together at one end, and after individually independent other ends thereof are respectively fitted in the terminal insertion portions for fixation thereat, the connected portion may be cut and divided into separate lead terminals 4. With this method, the operating efficiency can be improved by omitting the operation of burying the part of the lead terminals 4 in the motor frame 21.

Moreover, with a conductive filler being blended in the motor frame 21, even if static electricity is generated when a recording disk is installed on the hub 7 for rotation at a high speed, it is possible to allow the static electricity so generated to escape via the hub 7 and the bearings. In this case, however, it is preferable that the portions are mold from an insulating resin where the lead terminals 4 are embedded, the lead terminals 4 are brought into abutment and in the vicinity of those portions, while the conductive filler is blended into the remaining portions.

Furthermore, the lead terminals 4 are not limited to the mode described above but may be constructed such that, as shown in FIG. 5, the end portion 43 of a lead terminal 4A protrudes vertically downwardly. In this case, a connector 35 may be provided on the motor resting surface 32 of the motor so that the end portion 43 of the lead terminal 4 can be inserted thereinto from above and pulled out therefrom.

In addition, the shaft-rotating spindle motor has been described in the above mode of operation of the invention, the present invention may be applied to a shaft-fixed spindle motor.

As has been described heretofore, with the spindle motor according to the present invention, since the lead terminals are embedded or inserted for fixation in the resin motor frame so that they get integral with the motor frame, there is no need to fix to the bottom portion of the motor frame a connector, a part which is relatively thick in a height direction of the motor. Therefore, the motor can be thinned. Also, being different from the case where the FPC board, which is easy to be deformed, is used, with the present invention, there is no risk of the wiring pattern being disconnected or the terminals being deformed, this serving to improve the reliability of the motor. Moreover, when the spindle motor adopting the present invention is installed in a notebook-sized personal computer for driving a disk, even if the personal computer is mistakenly dropped, an impact produced then can be absorbed and hence moderated by the resin molded motor frame, whereby there is caused no risk of noise and/or run-out attributed to the impact so produced being generated while the disk is rotating, and moreover the disk can be freed from a risk of being prevented from rotating by the impact produced. Furthermore, vibrations generated to the ball bearings and the armature while the motor is being driven can be absorbed by the motor frame, whereby noise can be reduced. Also, the lead terminals are exposed from the predetermined positions on the back side of the motor frame, whereby an electrical connection can be effected between the lead terminals and the feed portion of the motor apparatus only by placing the motor frame on the motor apparatus, whereby the assembling efficiency of the motor apparatus can be improved.

What is claimed is:

1. A spindle motor comprising:
   a motor frame adapted to be mounted to a motor apparatus, said motor frame being formed by a resin molded piece;
   a rotor supported rotatably relative to said motor frame;
   a stator core held on said motor frame to confront a driving magnet of said rotor;
   coils wound around said stator core;
   a plurality of lead terminals embedded in said motor frame on a side thereof opposite to a side where said stator core is disposed in such a manner as to be partially exposed; and
   a through-hole formed in said motor frame for leading ends of said coils therethroucgh out to said side opposite to said side where said stator core is disposed for connection to said lead terminals,
   wherein said lead terminals are provided at central portions of said motor frame, connecting portions are formed at one of end portions of said lead terminals for connection with the ends of said coils, and contact portions are slantingly formed at the other end portions for contact with feed portions provided on the motor in such a manner that when said feed portions are brought into contact with said contact portions at the other end portions, the contact portions at the other end portions are pressingly fitted to said feed portions by elastically deforming the slanted contact portions.

2. A spindle motor as set forth in claim 1, wherein said lead terminals are embedded in said motor frame at longitudinal central portions thereof, and wherein the slanted contact portions are formed so that tip end portions thereof are far from said motor frame, and said motor frame is mounted on the motor, the tip end portions of the slanted contact portions being elastically deformed toward the motor frame by said feed portions to be pressingly fitted with said feed portions.

3. A spindle motor as set forth in claim 2, wherein said contact portions are elastically bent in a direction away from said motor frame, and wherein said contact portions are gradually slanted away from said motor frame.

4. A spindle motor as set forth in claim 1, wherein said motor frame is formed from an insulating resin at and in the vicinity of portions where said lead terminals are embedded and abutted, and wherein a conductive filler is blended therein at remaining portions of said motor frame.

5. A spindle motor as set forth in claim 1, wherein said motor frame is formed from an engineering plastic.

6. A spindle motor, comprising:
   a motor frame adapted to be mounted to a motor apparatus, said motor frame being formed by a resin molded piece;
   a rotor supported rotatably relative to said motor frame,
   a stator core held on said motor frame to confront a driving magnet of said rotor;
   coils wound around said stator core;
   a plurality of lead terminals embedded in said motor frame on a side thereof opposite to a side where said stator core is disposed in such a manner as to be partially exposed; and
   a through-hole formed in said motor frame for leading ends of said coils therethrough out to said side opposite to said side where said stator core is disposed for connection to said lead terminals,
   wherein said lead terminals are embedded in said motor frame at longitudinal central portions thereof, connecting portions are formed at one of end portions of said lead terminals for connection with said ends of said coils, and contact portions are formed at the other end portions for contact with feed portions provided on said motor apparatus,
   wherein said motor frame has in a bottom portion thereof first and second recessed portions and a terminal holding portion at an intermediate portion between said first and second recessed portions for said lead terminals to be embedded in, said connecting portions being disposed in said first recessed portion and said contact portions being disposed in said second recessed portion.

7. A spindle motor comprising:
   a motor frame adapted to be mounted to a motor apparatus, said motor frame being formed by a resin molded piece;
   a rotor supported rotatably relative to said motor frame;
   a stator core held on said motor frame to confront a driving magnet of said rotor;
   coils wound around said stator core;
   a terminal insertion portion provided in said motor frame on a side thereof opposite to a side where said stator core is disposed for a plurality of terminals to be individually fitted in; and
   a through-hole formed in said motor frame for leading ends of said coils therethrough out to said side opposite to said side where said stator core is disposed for connection to said lead terminals,
   wherein said lead terminals are provided at central portions of said motor frame, connecting portions are formed at one of end portions of said lead terminals for connection with the ends of said coils, and contact portions are slantingly formed at the other end portions for contact with feed portions provided on the motor in such a manner that when said feed portions are brought into contact with said contact portions at the other end portions, the contact portions at the other end portions are pressingly fitted to said feed portions by elastically deforming the slanted contact portions.

8. A spindle motor as set forth in claim 7, wherein said lead terminals are fitted in said terminal insertion portion at longitudinal central portions thereof, and the slanted contact portions are formed so that tip end portions thereof are far from said motor frame, and said motor frame is mounted on the motor, the tip end portions of the slanted contact portions being elastically deformed toward the motor frame by said feed portions to be pressingly fitted with said feed portions.

9. A spindle motor as set forth in claim 8, wherein said contact portions are elastically bent in a direction away from said motor frame, and wherein said contact portions are gradually slanted away from said motor frame.

10. A spindle motor as set forth in claim 7, wherein said motor frame is formed from an engineering plastic.

11. A spindle motor as set forth in claim 7, wherein said motor frame is formed from an insulating resin at and in the vicinity of portions where said lead terminals are embedded and abutted, and wherein a conductive filler is blended therein at remaining portions of said motor frame.

12. A spindle motor, comprising:

a motor frame adapted to be mounted to a motor apparatus, said motor frame being formed by a resin molded piece;

a rotor supported rotatably relative to said motor frame;

a stator core held on said motor frame to confront a driving magnet of said rotor;

coils wound around said stator core;

a terminal insertion portion provided in said motor frame on a side thereof opposite to a side where said stator core is disposed for a plurality of lead terminals to be individually fitted in; and a through-hole formed in said motor frame for leading ends of said coils therethrough out to said side opposite to said side where said stator core is disposed for connection to said lead terminals, wherein said lead terminals are fitted in said terminal insertion portion at longitudinal central portions thereof, connecting portions are formed at one of end portions of said lead terminals for connection with said ends of said coils, and contact portions are formed at the other end portions for contact with feed portions provided on said motor, wherein said motor frame has in a bottom portion thereof first and second recessed portions and said terminal insertion portion at an intermediate portion between said first and second recessed portions, said connecting portions being disposed in said first recessed portion and said contact portions being disposed in said second recessed portion.

* * * * *